United States Patent [19]
Powell

[11] Patent Number: 4,514,110
[45] Date of Patent: Apr. 30, 1985

[54] GATE ASSEMBLY FOR PONDS

[75] Inventor: Stanley Powell, Lowton, Near Warrington, England

[73] Assignee: British Nuclear Fuels Limited, Risley, England

[21] Appl. No.: 451,856

[22] Filed: Dec. 21, 1982

[30] Foreign Application Priority Data

Dec. 30, 1981 [GB] United Kingdom ............... 8139014

[51] Int. Cl.³ ........................... E02B 7/26; E02B 7/54
[52] U.S. Cl. ..................................... 405/104; 405/87
[58] Field of Search .............. 405/103, 104, 105, 106, 405/87

[56] References Cited

U.S. PATENT DOCUMENTS

| 1,978,858 | 10/1934 | Dorazio | 405/104 |
| 2,229,629 | 1/1941 | Anderson | 405/104 |
| 2,311,666 | 2/1943 | Kalix | 405/105 |
| 3,371,493 | 3/1968 | Woolley | 405/106 |
| 3,796,010 | 3/1974 | Carlson | 405/106 X |
| 4,220,420 | 9/1980 | Aston | 405/104 |
| 4,288,059 | 9/1981 | Gurbin | 405/105 X |

Primary Examiner—David H. Corbin
Attorney, Agent, or Firm—William R. Hinds

[57] ABSTRACT

A gate assembly for sub-dividing a pond or reservoir into separate compartments comprises a gate (1) vertically slidable in a cooperating frame (2) secured in the floor and side walls of the pond. The frame (2) is of channel section and a sealing member (9) on the gate (1) cooperates with the frame (1) to provide a seal therebetween. The gate (1) is drawn against the frame (2) as it is lowered into position by means of cooperating wedge members (16,17) on the frame and the gate. On draining the compartment (4) at the side of the gate (1) carrying the sealing member (9) the gate is further urged into sealing engagement with the frame (2) by the pressure of the liquid in the compartment (3) at the opposite side of the gate (1).

4 Claims, 3 Drawing Figures

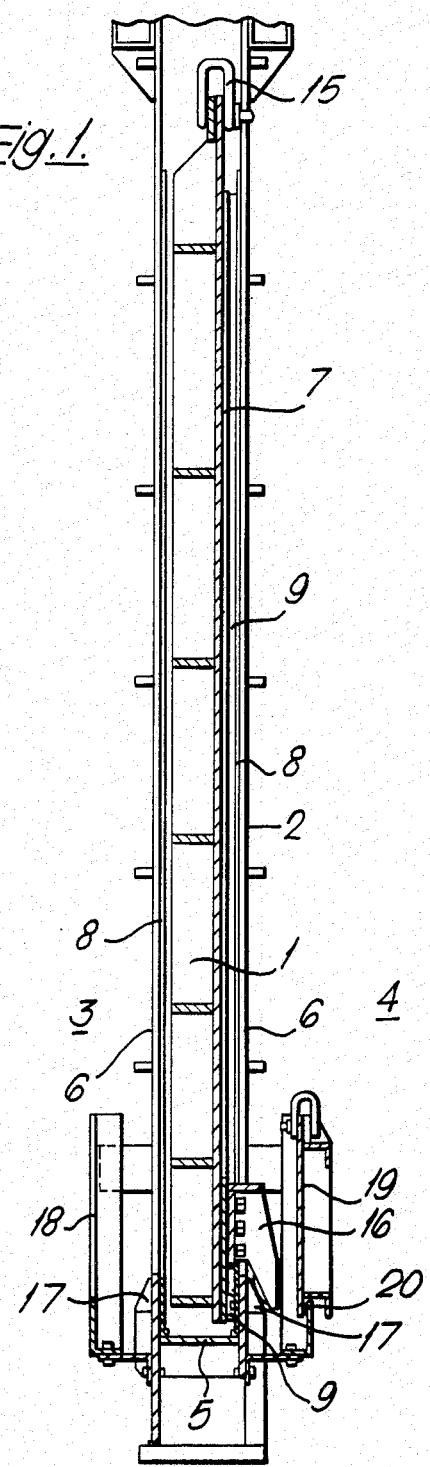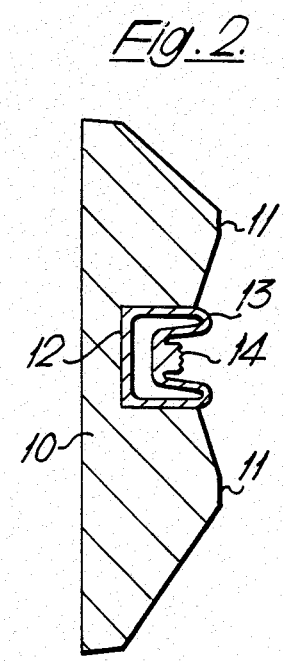

4,514,110

GATE ASSEMBLY FOR PONDS

BACKGROUND OF THE INVENTION

The present invention concerns a gate assembly for sub-dividing ponds or reservoirs into separate compartments.

It is standard practice to store irradiated nuclear fuel elements under water in ponds and it is desirable that the ponds can be sub-divided into separate compartments, which can be drained, for example, in order to perform maintenance or other operations.

FEATURES AND ASPECTS OF THE INVENTION

According to the present invention a gate assembly for sub-dividing a pond or reservoir into separate compartments comprises a gate slidable in a cooperating frame, a sealing member on one of the frame or gate cooperable with an opposing face of the gate or frame respectively to effect a substantially liquid-tight seal therebetween and cooperable wedge members on the frame and the gate to urge the gate into sealing engagement with the frame as the gate is moved into position in the frame.

Preferably, the sealing member is mounted on the gate and comprises a primary seal having lips to engage the frame and supporting a secondary inflatable seal.

Conveniently the frame and gate are rectangular, the frame having two uprights of channel-shaped section separated by a base of similar section.

DESCRIPTION OF THE DRAWINGS

The invention will be described further, by way of example, with reference to the accompanying drawings; in which:

FIG. 1 is a sectional elevation of a gate mounted in a frame;

FIG. 2 is a section, not to scale, of a sealing member to effect a liquid-tight seal between the gate and frame;

DESCRIPTION OF THE PREFERRED EMBODIMENT

Figure 3:
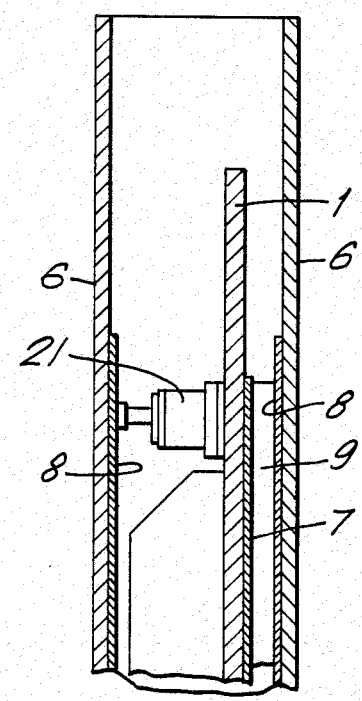
FIG. 3 is a section, not to scale, through an upper region of the gate and frame assembly.

An assembly for sub-dividing a pond, reservoir or the like into separate, substantially liquid-tight compartments comprises a gate 1 cooperable with a frame 2, the frame being fixed in the walls and floor of the pond, reservoir or the like and providing a support for the gate which latter is movable vertically into and out of its operative position. In FIG. 1, the gate is shown in its lowered operative position to form separate compartments 3 and 4 within a pond. The frame comprises a base 5 of channel-shaped section in the floor of the pond and upright channel-shaped legs 6 in the side walls of the pond.

Strips of steel 7 can be secured along the bottom and side edges of the face of the gate. Similar strips of steel 8 can be provided in the base 5 and upright legs 6 of the frame.

A continuous length of a sealing member 9 is secured, for example, by adhesive, to the steel strip 7 on the gate 1. The sealing member is profiled as shown in FIG. 2 and comprises a primary seal 10 in the form of a block of a synthetic resinous material, for example, having two sealing lips 11 disposed one at each side of a channel 12. The channel 12 contains a flexible and inflatable secondary seal 13. In a deflated condition the seal 13 assumes a sectional configuration as shown in FIG. 2 but on inflation with a pressure fluid a central lip 14 is urged outwardly to form a sealing surface. Alternatively, the sealing member 9 can be mounted on the frame.

In use, the frame is lowered into position within a flooded pond by means of lifting lugs 15 fixedly secured to the upper edge thereof. A projecting wedge member 16 is mounted at the bottom of the face of the gate to cooperate with a corresponding wedge member 17 at the base of the frame. As the gate is lowered into position the cooperating wedge members 16 and 17 draw the gate and hence the sealing member 9 against the frame. The lips 11 on the primary seal 10 sealingly engage the steel strip 8 on the frame to provide a liquid-tight seal between the compartments 3 and 4. The compartment 4 can then be drained and the pressure of the liquid in the compartment 3 will urge the gate into sealing engagement with the frame. The secondary seal 13 is inflated in the event of any leakage across the primary seal 10 to urge its sealing lip 14 against the strip 8. Although the gate will be urged into sealing engagement with the frame by the pressure of liquid in the compartment 3, jacking means 21 can additionally be mounted at the upper end of the gate and operable between the gate and the frame to urge the gate into sealing engagement with the frame.

The gate is reversible, that is it can be inserted into the frame so as to sealingly engage the opposite side of the frame to that shown in FIG. 1 when it is required to drain the compartment 3.

A second gate frame 18 can be provided at the bottom and at each side of the frame 2. A second removable gate 19 cooperates with the frames 18. As shown in FIG. 1 the gate 19 is located in position on the frame 18 within the compartment 4 and provides a back-up facility to contain any liquid which might leak across the sealing member 9 from the compartment 3. The gate 19 can be releasably clamped to the frame 18 to compress a seal 20 therebetween.

I claim:

1. A gate assembly for subdividing a pond, reservoir and the like into separate compartments comprising a frame having side and base members fixed in the walls and floor of the pond, reservoir and the like, a vertically movable gate slidable in and supported by the frame, a sealing member extending along the base and sides on one of the frame and the gate and cooperable with an opposing face on the respective gate and frame to effect a substantially liquid-tight seal therebetween, and cooperable wedge members on the frame and the gate to urge the gate into sealing engagement with the frame as the gate is lowered into position in the frame, in which the sealing member includes a primary seal and a secondary seal, the primary seal being a profiled block, two continuous spaced-apart sealing lips on the block engageable with said opposing face, a channel in the block between the sealing lips, the secondary seal being housed in the channel and comprising a flexible and inflatable member operable upon inflation to sealingly engage said opposing face on the respective gate and frame.

2. A gate assembly according to claim 1 including jacking means on the gate and cooperable with the frame to assist in the sealing engagement between the gate and the frame.

3. A gate assembly as claimed in claim 1 wherein said frame is generally symmetrical about a plane passing through said side and base members, including the provision of a second oppositely disposed wedge member, such that the gate can be inserted into the frame to sealingly engage the opposite side of the frame to permit a higher liquid level on either side of the gate to urge the gate into tighter sealing engagement, and said gate is removable and reversible.

4. A gate assembly according to claim 3 in which the frame is channel-shaped in section.

* * * * *